Figure 1:
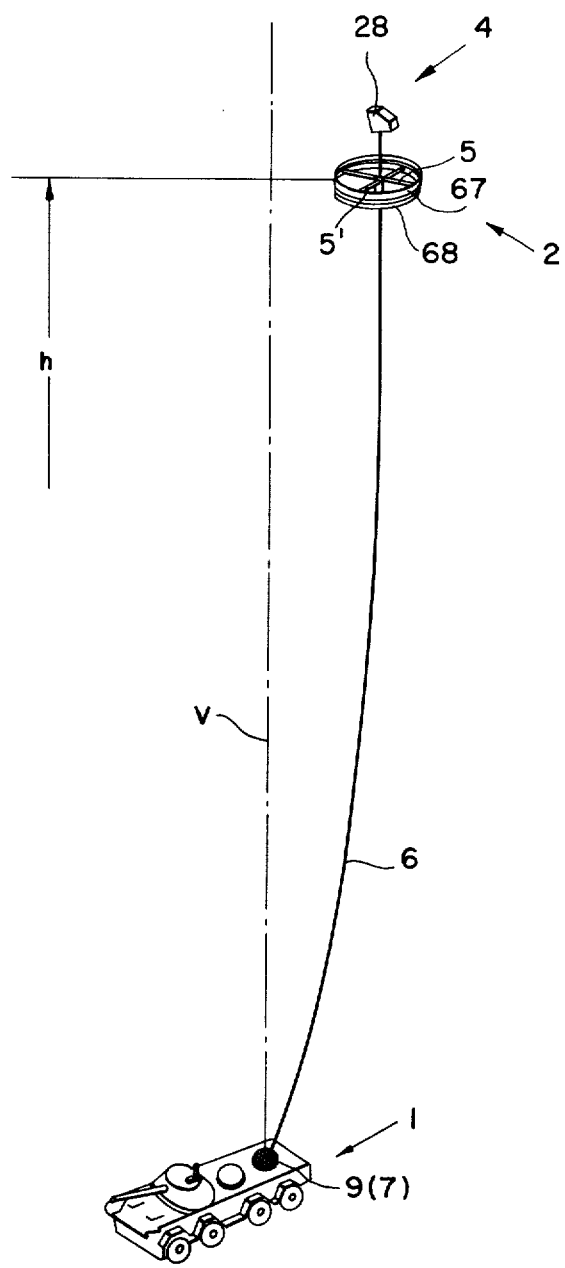

United States Patent [19]

Hund

[11] 4,004,759
[45] Jan. 25, 1977

[54] VERTICALLY-FLYING AIRCRAFT

[75] Inventor: Roland Hund, Immenstaad, Germany

[73] Assignee: Dornier System GmbH, Germany

[22] Filed: June 10, 1975

[21] Appl. No.: 585,528

[30] Foreign Application Priority Data

July 16, 1974 Germany .................. 2434042

[52] U.S. Cl. .................. 244/17.17; 244/17.15
[51] Int. Cl.[2] .................. B64C 27/20
[58] Field of Search .......... 416/60, 128, 129, 115; 244/17.17, 17.15, 17.13, 17.23, 23 C, 12 C, 17.11, 100 R

[56] References Cited

UNITED STATES PATENTS

| | | | |
|---|---|---|---|
| 1,843,643 | 2/1932 | Kimball | 244/17.15 |
| 2,380,581 | 7/1945 | Prewitt | 244/17.13 |
| 2,980,365 | 4/1961 | Yohe | 244/17.17 X |
| 3,064,925 | 11/1962 | Preston | 244/17.23 |
| 3,223,359 | 12/1965 | Quick et al. | 244/17.13 |
| 3,241,145 | 3/1966 | Petrides | 244/17.17 UX |

Primary Examiner—George E. A. Halvosa
Assistant Examiner—Barry L. Kelmachter
Attorney, Agent, or Firm—James E. Bryan

[57] ABSTRACT

This invention relates to a vertically-flying aircraft adapted to fly while moored to a ground station comprising at least one rotor for producing vertical thrust, and a mechanically-acting storage mass for storing at least a substantial portion of the required drive energy for the drive of the rotor.

10 Claims, 5 Drawing Figures

VERTICALLY-FLYING AIRCRAFT

The present invention relates to a vertically-flying aircraft with one or several rotors which serve for generating vertical thrust, for example rotating wings, shrouded propellers, or the like.

Already known in the art are moored aircraft wherein the aircraft carries a drive unit by means of which a rotor is driven. In these known aircraft, fuel is fed to the drive unit by way of the mooring line. In addition to the drive unit, the aircraft also carries means for position stabilization and for stabilization above ground.

Further known in the art are moored aircraft which carry an electric motor for the drive of a rotor, wherein the electric motor is connected by way of lines in the mooring cable with a current-generating unit of a ground station.

Additionally known in the art are moored aircraft having rotors whose rotor blades are provided at the outer ends thereof with jet reaction nozzles. Propellant gas is fed to the nozzles from a gas generator of a ground station by way of the mooring line which is hollow.

The known moored aircraft are provided for flying missions which extend over prolonged periods of time. As the useful load, the aircraft carry observation, transmitting and receiving instruments for radio waves, or the like.

It is the object of the present invention to provide an aircraft which serves for housing sensors and transmitters or receivers, while being so constructed that it can be detected only with difficulty. The aircraft is also intended to have the lowest possible weight and the smallest possible dimensions. It is intended to produce as little noise as possible, and it is intended not to be locatable by means of infrared rays. In addition thereto, the detectability by means of radar should be maintained as low as possible. Furthermore, the aircraft is intended to have a good inherent stability. Moreover, low structural and maintenance costs are intended to be required with a minimum of structural expenditure.

This object is obtained, in accordance with the present invention, by virtue of the fact that the aircraft flies while being tied to a ground station by means of a cable and is adapted to be extended and retracted by of the cable, and by virtue of the fact that the aircraft contains mechanically-acting storage means for the storage of at least a substantial part of the required drive energy for the drive of the rotors. A moored aircraft constructed in this manner is adapted — during the required duration of the flying mission — to execute observations, by means of its sensors, particularly of the earth surface, according to its flight altitude. By virtue of the inventive construction, noises which the aircraft develops are reduced to a minimum, and hence the detectability thereof is decreased considerably. Furthermore, due to the fact that there are no drive units present which can produce heat radiation, the aircraft cannot be located by infrared rays. Because of the small dimensions of the aircraft, the radar detectability thereof is also considerably reduced. By reason of the relatively small structural expenditure and the uncomplicated construction, there are low manufacturing and maintenance costs.

As a further development of the present invention, one characteristic of the present invention is that for generating vertical thrust there are two rotors mounted at the aircraft, being arranged coaxially with respect to each other and counterrotating. A flawless stabilization of the aircraft is thereby rendered possible.

In a further development of the principal inventive concept, it is of particular advantage that the rotors carry jacket rings acting as inertia masses. On the one hand, these jacket rings serving as inertia masses contribute toward the stabilization of the aircraft and, on the other hand, a simple means for storing the drive energy for the rotors is created.

According to a still further embodiment of the present invention, an auxiliary drive adapted to be coupled to the rotors for the selective drive thereof is mounted on the aircraft. By means of such an auxiliary drive, which may be, for example, an electric motor, it is possible to extend the duration of the flight mission for a specific period.

By virtue of the fact that the rotor or rotors is or are relatively displaceable in the direction of the fulcrum of the rotor with respect to the mooring cable and with respect to the mooring cable supporting means against the action of a spring means, and due to the fact that a gear unit is present which acts upon the rotor blades in the sense of a change of the angle of attack, the thrust with which the aircraft pulls at the mooring cable is automatically maintained within a specific order of magnitude.

Furthermore, one characteristic for the further development of the present invention is that, for alignment of the aircraft in the azimuth, a braking device is provided, whose braking member coacts with braking surfaces at the rotors or the drive thereof for producing moments in the circumferential direction, relative to the axis of rotation of the rotor. With the aid of this construction it is possible to achieve, in an extremely simple manner and without additional control motors, with the gears appertaining thereto, an alignment of the aircraft, and therewith of the sensors in the azimuth, for example for observations of the earth surface.

Lastly it is proposed, according to yet another characteristic of the present invention, to provide the aircraft with a landing gear whose elastic arms carry receiving rollers for the jacket ring of the rotors. What is achieved thereby is the fact that the aircraft is adapted to elastically touch down on the landing or starting platform of the ground station. Additionally, with the aid of the mooring cable and the mooring cable winch as well as the elastic arms of the landing gear, it is possible to pull the aircraft against the landing platform for the transport. Because of the elastic arms of the landing gear which bend at that time, the structural height of the aircraft for transport is reduced. The receiving rollers at the elastic arms of the landing gear prevent damage to the rotors during the touchdown on the landing or starting platform.

Figure 2:
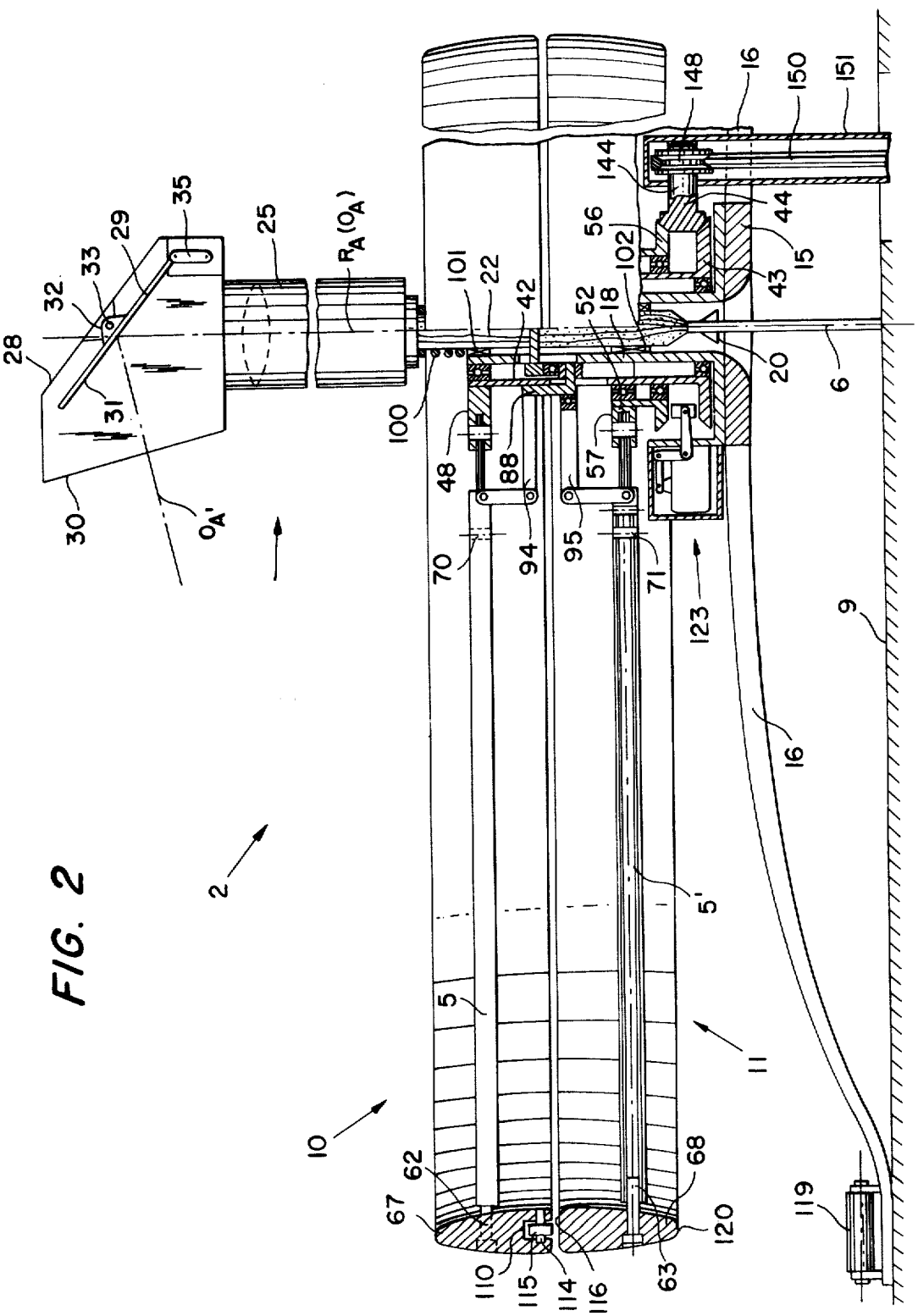
Figure 3:
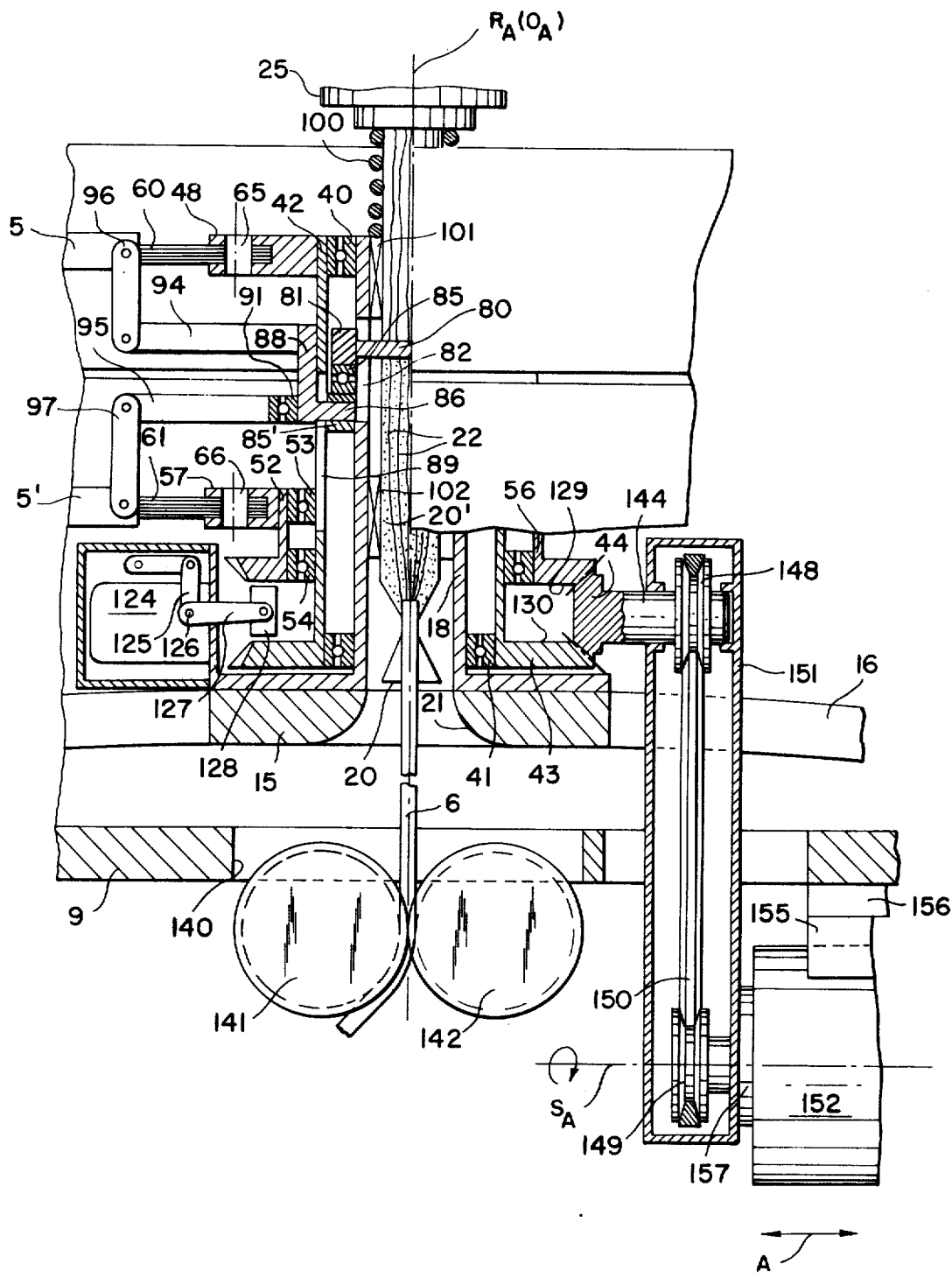
Figure 4:
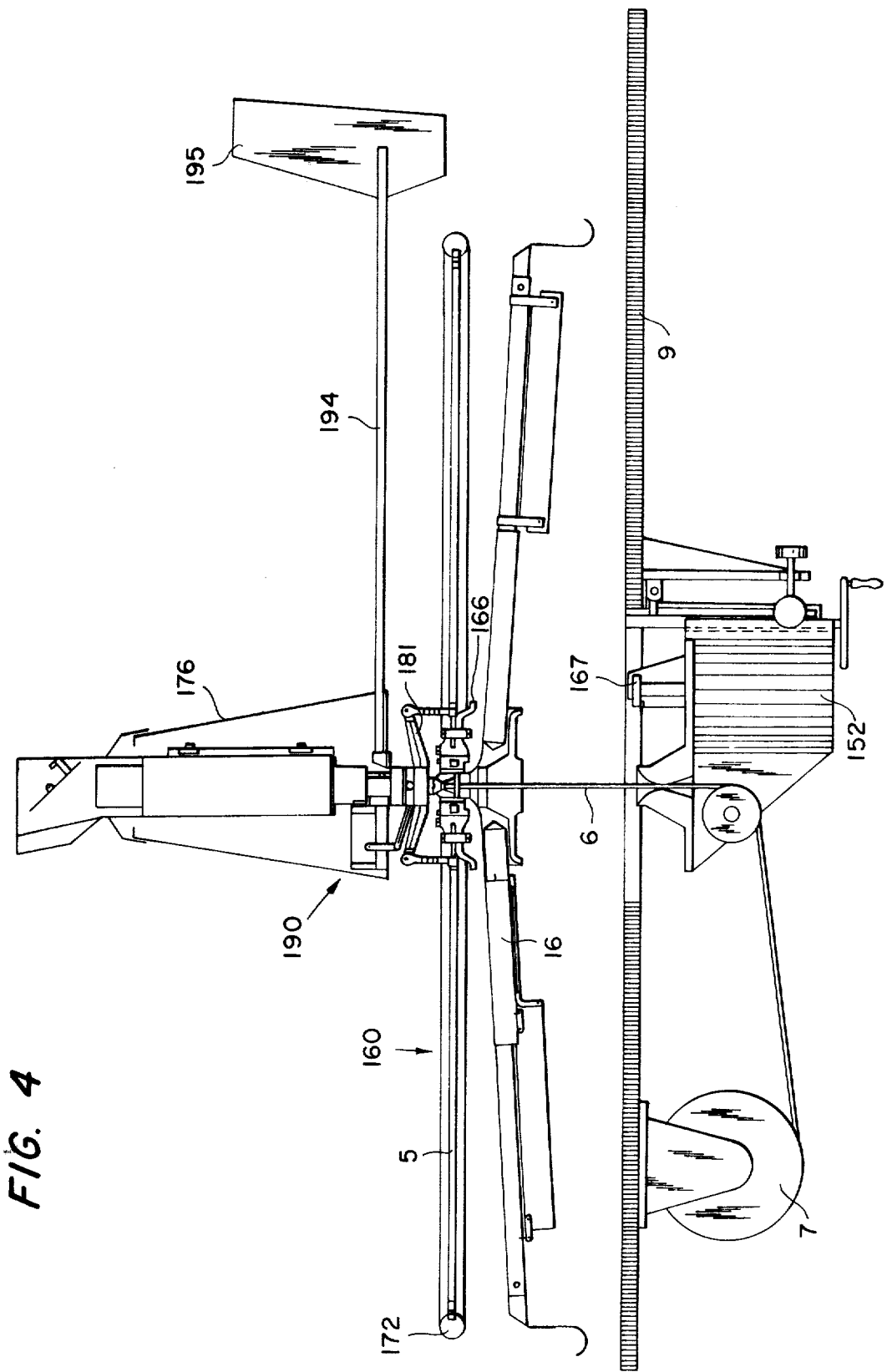
Figure 5:
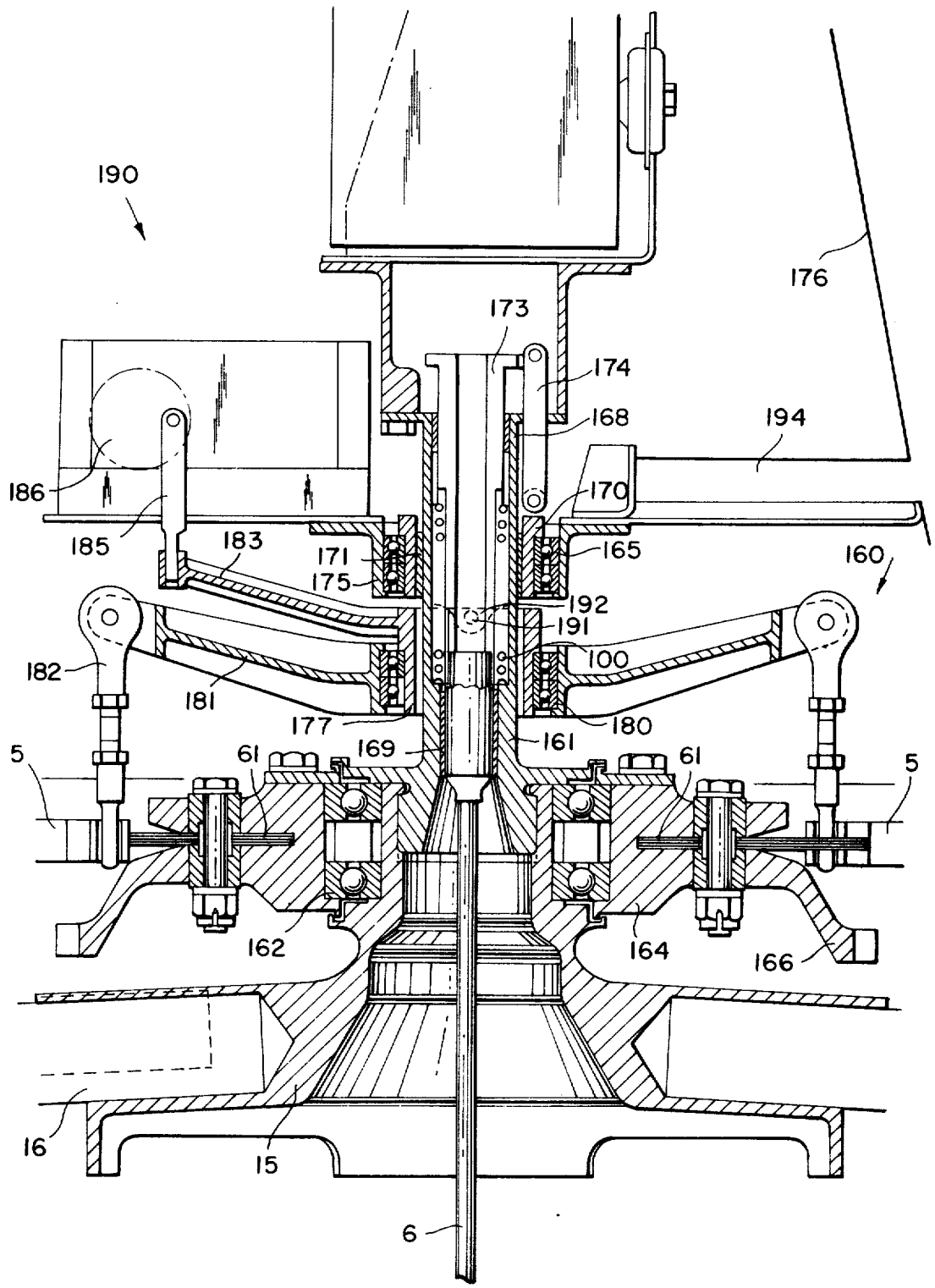

Two embodiments according to the present invention are illustrated in the accompanying drawings, wherein FIG. 1 shows, in a schematic view, one embodiment of the moored aircraft in flight in connection with a ground station;

FIG. 2 shows the aircraft in a side view thereof, at an enlarged scale as compared to FIG. 1, and partially in cross-section, FIG. 3 shows a segment from FIG. 2 at an enlarged scale, FIG. 4 illustrates, as a second embodiment, a simplified construction of the aircraft in a side view thereof, and partially in cross-section, and FIG. 5 illustrates, in a segment from FIG. 4 at an enlarged scale, details of the aircraft in cross-section.

As the embodiments illustrated herein, the drawing shows an aircraft which, for the purpose of producing lift, has a rotor or rotors with rotor blades and a carrier for useful loads.

According to the illustrated embodiments, the ground station includes a vehicle containing the mooring means, an operating and control post, as well as a drive unit.

In FIG. 1, reference numeral 1 is used to identify the transportable or mobile ground station, reference numeral 2 identifies the moored aircraft, and reference numeral 6 defines the mooring cable between the aircraft 2 and the ground station 1. The aircraft 2 obtains lift by means of two rotors 10 and 11 (FIG. 2) which counterrotate and are provided with rotor blades 5 and 5'. The aircraft 2 carries a useful load 4, which will be described in further detail hereinbelow. The ground station 1 serves, inter alia, for mounting a cable winch 7 which is actuatable for reeling in or unreeling the mooring cable 6 for the controlled retraction or extension of the aircraft 2 and for the setting of a predetermined flight altitude $h$. The winch 7 is of conventional construction and will therefore not be further described herein. The ground station further includes a drive motor with a corresponding transmission gearing for the operation of the cable winch 7 as well as another drive unit for the drive of the rotors 10 and 11 on the ground, whose operation will be further explained hereinbelow. The ground station 1 additionally carries the landing pad 9 on which the aircraft 2 in the retracted position thereof is received.

Identified with the reference letter V in FIG. 1 is the vertical above ground mooring point at the cable winch 7, and shown in this Figure is a deviation of the aircraft 2 from the vertical V, caused by wind influences.

As is apparent in detail from FIGS. 2 and 3, the aircraft 2 is composed of two counterrotating rotors 10 and 11, a landing gear 16, and a drive unit which will be described in further detail hereinbelow, as well as a useful load 4. Rigidly connected with a base plate 15 is the landing gear 16 which is composed of three resilient arms. Also rigidly connected with the base plate 15 is the rotor mast 18 which is hollow and which is concentric with the rotor axis of rotation $R_A$. Inserted within the rotor mast 18 is the mooring cable supporting means 20 for the connection of the mooring cable 6 with the aircraft 2, and is adapted to carry out a relative movement in the direction of the rotor axis $R_A$ with respect to the rotor mast 18, which will be explained in further detail hereinbelow. The mooring cable supporting means 20 comprises a jacket wherein the individual mooring cable strands 22 of the mooring cable 6 are embedded, separately from each other, within a synthetic resin mass 20'. The mooring cable 6 extends through a downwardly-widening funnel-like opening 21 in the base plate 15 toward the mooring cable supporting means 20.

Combined with the mooring cable supporting means 20 is a housing which serves for receiving a television camera 25. The optical axis $O_A$ of the television camera 25 coincides with the rotor axis $R_A$. Rigidly mounted upon the camera housing 25 is another housing 28 in which a deflecting mirror 29 is pivotally positioned by way of a pivot mounting 32 with a pivot axis 33. The reflecting surface 31 of the deflecting mirror 29 is oriented by way of an opening 30 in the housing 28, shown here inclined against the earth surface. Provided for the purpose of setting the deflecting mirror 29 to a predetermined position of inclination is a displacing device 35 which is actuatable from the ground station 1.

Mounted concentrically with respect to the stationary rotor mast 18, by means of two radial bearings 40 and 41, is a freely rotatable drive shaft 42 which is hollow and which has a bevel drive gear 43 at the lower end thereof in a manner secure against rotation. The bevel drive gear 43 position in meshing engagement with a driving pinion 44 which may be selectively brought into engagement with the bevel drive gear 43. At the upper end thereof, the drive shaft 42 carries a carrier disc 48 from which the drive is transmitted to the rotor blades 5 of the upper rotor 10.

Mounted concentrically with the drive shaft 42 is a second drive shaft 52 which is also hollow and which is adapted to freely rotate via radial bearings 53 and 54. At the other end thereof, the drive shaft 52 is provided with a bevel drive wheel 56 whose teeth mesh with the teeth of the driving pinion 44. The two drive bevel wheels 43 and 56 have an opposite direction of rotation during the drive via the driving pinion 44. A further carrier disc 57 is rigidly connected with the drive shaft 52, and this carrier disc 57 serves for the transmission of the drive to the rotor blades 5' of the lower rotor 11. The rotor blades 5 and 5' are resiliently received — at the ends thereof facing the rotor axis $R_A$ — each by means of one leaf type spring set 60 and 61, at the coordinated carrier disc 48 and 57. The spring sets 60 and 61 serve simultaneously for carrying along the rotor blades 5 and 5' in the circumferential direction and are connected with the carrier discs 48 and 57 by means of supporting bolts or pins 65 and 66, and are secured by means of supporting bolts 70 and 71 to the rotor blades 5 and 5' of the upper and lower rotors 10 and 11. Mounted concentrically to the rotor axis $R_A$ are two jacket rings 67 and 68 which are coaxial with respect to each other, and these jacket rings 67 and 68 are in operative connection with the outer ends of the rotor blades 5 and 5'. Provided at the jacket rings 67 and 68 are radially mounted bearing bolts 62 and 63 upon which the rotor blades 5 and 5', being hollow, are slid and rotatably mounted. The jacket rings 67 and 68 have a specific weight and serve, in addition to receiving the outer rotor blade ends, as driving inertia masses.

Provided at the mooring cable supporting means 20 are setting or adjusting arms 80 which carry a setting ring 81. The setting arms 80 project radially outwardly from the mooring cable supporting means 20 through apertures 82 in the rotor mast 18, whereby the setting ring 81 acts upon a second setting ring 85' by way of an axial bearing 85 in the direction of the rotor axis $R_A$. The setting ring 85' carries radially-directed setting arms 86 which project through apertures 89 in the drive shaft 42 and at the outer ends thereof securely receive a sliding sleeve 88 which concentrically encloses the drive shaft 42. A switching arm 95 is freely rotatably positioned at the sliding sleeve 88 by way of a radial bearing 91. A second switching arm 94 is additionally rigidly connected with the sliding sleeve 88. The switching arms 94 and 95 act by way of the control levers 96 and 97 upon the rotor blades 5 and 5' of the upper and lower rotors 10 and 11 and transmit an initiated displacing movement in the direction of the rotor axis $R_A$ to the rotor blades in the sense of a collective rotor blade displacement.

Inserted between the mooring cable supporting means 20, and the housing for the television camera 25, and the rotor mast 18 is a spiral spring 100, and the rotor mast 18 also includes, at the inside thereof, the friction bearings 101 and 102. The rotor mast 18 together with the landing gear 16 and the rotors 10 and 11 as well as the drive members thereof, such as for example the drive shafts 42 and 52 and carrier discs 48 and 57, can execute in the friction bearings 101 and 102 a relative movement in the direction of the rotor axis $R_A$ with respect to the mooring cable 6 and the supporting means 20 thereof, as well as the useful load 4 provided thereon. This movement is used for the displacement of the angle of incidence position of the rotor blades 5 and 5', as will be further explained hereinbelow.

The jacket ring 67 of the upper rotor 10 has at the end face thereof facing the jacket ring 68 of the lower rotor 11 an annular recess 110 into which are inserted the supporting rollers 115 which are distributed on the circumference and freely rotate on roller axles 114. On the end face thereof facing the jacket ring 67, the jacket ring 68 forms a rolling surface 116 on which the supporting rollers 115 can roll off at the jacket ring 67.

There are further mounted at each one of the foot or base parts 16 of the landing gear of the aircraft 2, on the side facing the lower jacket ring 68, the receiving rollers 119 which are provided for the reception of the end rim 120 of the lower jacket ring 68 during the deflection of the arms 16 of the landing gear.

Reference numeral 123 identifies a braking device which includes a hydraulically-acting control motor 124 which latter acts, by means of a transmitting lever 125, a pivot bearing 126, and braking arms 127, upon a brake shoe 128. The brake shoe 128 is provided for three positions, namely a neutral position and one braking positon each in which the brake shoe 128 may be made to apply either against the brake surface 129 at the drive level wheel 56, or against the brake surface 130 at the drive bevel wheel 43, for the azimuth positioning of the aircraft.

The starting platform 9 at the ground station 1 has a centrally continuous opening 140 through which the mooring cable 6 extends. Positioned at the platform 9 are the reversing rollers 141 and 142 which serve for reversing the mooring cable 6 toward the mooring cable winch 7. The mooring cable winch 7 and the drive thereof which is effected from the vehicle, i.e., from the ground station 1, is not described herein in any detail for the sake of simplicity.

Connected with the drive pinion 44 is a pinion shaft 144 which has a V-belt pulley 148 secured thereto. The pinion shaft 144 is positioned in a gear-box 151 which forms a unit with the housing of the drive motor 152. The drive motor 152 drives a V-belt pulley 149 which is in operative connection by way of the belt 150 with the V-belt pulley 148 and drives the pinion shaft 144 with the drive pinion 44 thereon. On the landing and starting platform 9, a guide means 156 is provided which coacts with a guide 155 at the drive motor 152 and allows for a displacement of the drive motor 152 with the drive 149, 150 and 148 and the pinion shaft 144 with the drive pinion 44, in the direction of the arrow A. The gearbox 151 is pivotal about the pivot bearing 157, i.e., the axle of the drive motor 152.

The mooring cable 6 is introduced into the mooring cable supporting means 20 as has already been described herein, and within the mooring cable supporting means 20 the individual mooring cable strands 22 are embedded in the synthetic resin mass 20', separately from each other. The mooring cable strands 22 are enclosed, outside of the mooring cable supporting means 20, by a sheathing. The mooring cable strands 22 serve not only for the transmission of traction force, but simultaneously as signal lines, for example for the transmission of the image signals produced by the television camera 25 to a corresponding receiver in the ground station 1. The mooring cable strands 22 further serve for the transmission of signals for the displacement of the deflecting mirror 29. Since such a displacing mechanism is known in the art, a description thereof in detail is not given herein. The landing and starting platform 9 of the ground station 1 may be leveled to compensate for any unevenness of the ground on which the vehicle is positioned.

The operation of the aircraft in conjunction with the coordinated ground station will now be described hereinafter.

The aircraft 2 is centered — by means of the elastic arms 16 thereof, as indicated in FIGS. 2 and 3 — on the landing and starting platform 9 of the ground station 1 by corresponding grippers, not shown. The aircraft 2 is held in place on the starting and landing platform 9 with the aid of the mooring cable 6 which, via the actuation of the mooring cable winch 7, exerts a corresponding pull on the aircraft 2. By means of the mooring cable winch 7 and the mooring cable 6, as well as the helical spring 100, the rotors 10 and 11 are pulled against the landing and starting platform 9, while a deflection of the elastic arms 16 of the landing gear of the aircraft 2 takes place, until the lower rotor 11 and the jacket ring 68 thereof together with the end rim 120 thereof lies against the receiving rollers 119 at the upper side of the elastic arms 16. Therewith the aircraft 2 is brought to the smallest possible dimension in the direction of the rotor axis $R_A$ and is prepared for transport by means of the ground station 1.

For the start of the aircraft 2, the drive motor 152 with the drive 148, 150, 149, the pinion shaft 144 and the drive pinion 44, is displaced in the direction of the arrow A according to FIG. 3 in the guide 155 and 156 at the landing and starting platform 9, and the drive pinion 44 is simultaneously brought into engagement with the bevel drive wheel 43 and the bevel drive wheel 56. As a result thereof, the drive shafts 42 and 52, and therewith via the carrier discs 48 and 57 the rotors 10 and 11 with the rotor blades 5 and 5' thereof are caused to counterrotate. At the same time, the jacket rings 67 and 68 being in operative connection with the rotor blades 5 and 5' also counterrotate. The jacket rings 67 and 68 which are utilized as inertia masses are brought to a rate of revolution which corresponds to the storage of a predetermined drive energy for the drive of the rotors 10 and 11, and the drive energy is sufficient to bring the aircraft to a specific flight altitude $h$ and to maintain it at that flight altitude for a predetermined period of time.

After the storage of the drive energy in the form of inertia mass in the jacket rings 67 and 68, the drive pinion 44 is disengaged from the bevel drive wheels 43 and 56 by displacement of the drive 148, 150, 149, 151 and the drive motor 152 in the guide 155 and 156 at the platform 9. Moreover, the centering means and gripper means (not shown) at the landing and starting platform 9 are released. After loosening of the mooring cable 6, a relative movement takes place, between the mooring cable 6 and the rotor mast 18 carrying the rotors 10 and 11 with the aid of the spring means 100, in the direction of the rotor axis $R_A$, and the rotor blades 5 and 5' are collectively and automatically brought — by way of the sliding sleeve 88 as well as the switching arms 94 and 95 and the control levers 96 and 97 — into an angle of incidence position required for the ascent of the aircraft 2. Thus the aircraft 2 begins to climb vertically against a predetermined cable pull to be maintained. The flight altitude in this case is determined by means of the controlled unreeling of the mooring cable 6 from the cable drum of the mooring cable winch 7.

If the lifting force produced by the rotors 10 and 11 should exceed a predetermined value, a collective change of the angle of incidence position of the rotor blades 5 and 5' will take place automatically. Such an automatic angle of incidence variation is effected in that a relative displacement takes place by way of the helical spring 100 between the mooring cable supporting means 20, the mooring cable 6, and the rotor mast 18 with the rotors 10 and 11, as has already been described hereinabove. In case of an increase of the tractive force at the mooring cable 6 beyond a predetermined value, the spring means 100 is compressed between the rotor mast 18, the mooring cable supporting means 20, and the mooring cable 6, and as a result, the sliding sleeve 88 will be carried along in the direction of the rotor axis $R_A$ by way of the setting arms 80, the setting ring 81, the setting ring 85', and the setting arms 86. Also carried along by the sliding sleeve 88 are the control levers 96 and 97 thereof which hingedly engage the rotor blades 5 and 5'. Accordingly, the angle of incidence position of the rotor blades 5 and 5' will be changed collectively in the sense of a reduction of the lift.

Conversely, i.e., in case the helical spring 100 should become slackened because of too low a tractive force at the mooring cable 6 produced by the aircraft 2 and the rotors 10 and 11, the rotor mast 18 and the mooring cable supporting means 20 are relatively moved in the opposite manner, and the rotor blades 5 and 5' are displaced in the sense of an angle of incidence increase, and therewith of an increase in lift. The lifting force effective at the aircraft 2 thus can be automatically maintained at a predetermined value for the required cable traction.

By means of the braking device 123 it is possible, as already indicated hereinabove, to achieve an alignment in the azimuth of the aircraft 2 with its useful load 4, i.e., in the present case the television camera 25. If a corresponding signal is given, via the mooring cable strands 22 serving as signal lines, to the double-acting control motor 124, this control motor effects, via the transmission lever 125 and the pivot bearing 126, a displacement of the braking arm 127. Depending upon whether the brake lining of the brake shoe 128 is brought into contact with the braking surface 129 on the bevel drive wheel 56, or with the braking surface 130 on the bevel drive wheel 43, a moment will be produced in either one or the other circumferential direction, with reference to the rotor axis $R_A$. This moment brings about a rotation of the aircraft 2 about the rotor axis $R_A$. Therewith also the reflection axis $O_A'$ of the television pickup camera 25 is concomitantly moved in the azimuth. The signals of the television image picked up are likewise guided, via the mooring cable strands 22, serving as signal lines, to a receiver instrument in the ground station 1, which is not further described herein.

By means of the displacing device 35 which is actuatable from the ground by way of the signal lines 22 of the mooring cable 6, it is possible to pivot the deflecting mirror 29 about its axis 33, and the optical axis $O_A'$ thereby may be changed with respect to its angle relative to the earth surface. Thus it is possible with the device as described herein to stabilize the aircraft 2 with respect to its position, to align it with its useful load 4 in the azimuth, and to further proceed with a setting of the angle of the optical axis $O_A'$ of the television camera 25 with extremely simple means.

If the stored drive energy decreases to a specific value, the aircraft 2 is brought down to the ground station 1 by means of the mooring cable winch 7 and the mooring cable 6, and is centered and locked on the starting and landing platform 9 in the manner previously described. For the purpose of simplifying the touchdown of the aircraft 2 on the starting and landing platform 9, the drive 148, 150, 149 and 151 is pivoted in the pivot bearing 157 about the axis of rotation $S_A$ of the drive motor 152 so that the landing platform 9 is free for the touchdown of the aircraft 2.

The embodiment illustrated in FIGS. 4 and 5 shows, in contrast to the embodiment according to FIGS. 1 to 3, an aircraft in which only a single rotor 160 is present with rotor blades 5 mounted thereon. Here again, as in the embodiment previously described, the rotor 160 is rotatably mounted at the rotor mast 161 by means of the radial bearings 162. The rotor hub 164 carries the rotor blades 5 by way of the leaf-type spring packs 61. Further present are an axle-drive bevel wheel 166 at the rotor hub 164, and a driving pinion 167 at the drive motor 152 (FIG. 4). Mounted concentrically to the rotor blades 5 is a jacket ring 172 which is carried by the rotor blades 5. The rotor blades 5 are so mounted with the ends thereof in bearings of the jacket ring 172 that they can be pivoted in the sense of a collective and/or cyclic displacement. The jacket ring 172 serves also in this embodiment as a mechanically-acting storage means in the form of an inertia mass for storing drive energy.

In addition to serving for storing drive energy, the jacket ring 172 serves at the same time for stabilizing the aircraft. The jacket ring acts during rotation in the manner of a twist or torque ring.

As has already been set forth in connection with the description of the embodiment according to FIGS. 1 through 3, the drive energy is taken from the drive motor 152, the drive motor being positioned at the landing and starting platform 9 of the ground station 1. The transmission of the drive energy from the drive motor 152 to the jacket ring 172 takes place via the driving pinion 167 and the axle-drive bevel wheel 166 on the rotor hub 164.

For effecting the collective rotor blade displacement, an axially displaceable sliding sleeve 173 guided by means of the sleeve bearings 168 and 169 is mounted concentrically within the rotor mast 161, which is hollow, and this sliding sleeve 173 is operatively connected by way of an engaging lever 174 with an engaging sleeve 170 which concentrically encloses the rotor mast. The sleeve 170 is positioned at the rotor mast 161 by means of a sleeve bearing 171. By way of the radial bearings 165, a flange 175 is positioned at the engaging sleeve 170 which flange carries a sheathing 176 enclosing the useful load 4 (FIG. 1). Further inserted between the sliding sleeve 173 and the rotor mast 161 is a spiral spring 100. This spring 100 acts in the same manner already described in connection with the description of the embodiment of FIGS. 1 to 3.

Further provided is a swivel sleeve 177, concentric to the rotor mast 161, which sleeve carries the setting arms 181 via the radial bearings 180. Pivotally mounted at the setting arms 181 are the shifter rods 182 which act each upon one of the rotor blades 5. The swivel sleeve 177 has a swivel arm 183 which extends radially outwardly and which acts, by way of a connecting rod 185, upon a disc 186, serving as a crank, of a displacing device 190. The displacing device 190 may be actuated, for example, from the ground station 1 by way of the control lines in the mooring cable, or via radio by means of a corresponding transmitting and receiving installation. The displacing device 190 contains a drive motor (not shown) and a coordinated reduction gear.

The swivel sleeve 177 includes two oppositely-positioned bearing bores for receiving the pivot axes 191, being coaxial with respect to each other. The pivot axes 191 simultaneously engage in bores at the bearing projections 192 at the flange 175. Thereby the swivel sleeve 177 is pivotal with respect to the rotor mast 161 about the pivot axes 191 positioned at a right angle to the rotor mast 161. The rotor blades 5 have imparted thereto — by means of the displacing device 190 by way of the disc 186, the connecting rod 185, the pivot arm 183 at the swivel sleeve 177, the setting arms 181 and the shifter rods 182 — according to the pivoting position of the swivel sleeve 177, a correspondingly positive or negative cyclic pitch movement for the control of the aircraft. The control may compensate for wind influences with respect to the position of the aircraft, and may also effect an intentional change of the position of the aircraft above ground.

Rigidly connected with the sheathing 176, which also serves for receiving the displacing device 190, is a radially outwardly extending mast 194. Mounted at the free end of the mast 194 is a vertically-positioned weather vane 195. It is by means of this weather vane 195 that — starting from a specific degree of the air onflow by the air surrounding the aircraft — the pivot axes 191 together with the swivel sleeve 177 are turned relative to the aircraft 2 and the rotor mast 161 by way of the mast 194, the sheathing 176, and the flange 175. In dependence upon the direction of air flow, the swivel sleeve 177 with the pivot axes 191 is pivoted into a position in which the rotor blades 5 execute, in known manner, a cyclic positive or negative pitch movement for compensating for the air flow. To the rotor blades 5 are thereby imparted — in a plane transverse to the air flow — their largest positive or negative angular position against the flow.

With the embodiments according to FIGS. 1 through 5 it is achieved that the aircraft can be brought to a specific altitude without expensive control means, can be maintained at this altitude for fulfilling a mission, can be returned in a guided manner to the ground station, and subsequently again can be caused to ascend.

Another advantage of these embodiments is that the inertia mass in the form of either one or several jacket rings is simultaneously utilized for stabilizing the flight attitude of the aircraft.

It will be obvious to those skilled in the art that many modifications may be made within the scope of the present invention without departing from the spirit thereof, and the invention includes all such modifications.

What is claimed is:

1. A vertically-flying aircraft having no on-board engine and being adapted to fly while moored to a ground station, comprising at least one rotatable rotor means for producing vertical thrust,
   mechanically-acting storage means for storing at least a substantial portion of the required drive energy for the drive of said rotor means,
   and coupling means adapted to connect said rotor means to a drive means of a ground station, whereby drive energy is stored in said rotor means.

2. An aircraft according to claim 1 in which said storage means comprises flywheel mass means connected to said rotor means for the storage of kinetic energy.

3. An aircraft according to claim 1 including two coaxially mounted rotor means adapted to counterrotate, and said coupling means being adapted to couple both of said rotor means to said drive means of a ground station, whereby drive energy is stored in said rotor means.

4. An aircraft according to claim 3 in which said rotor means carry jacket ring means acting as inertia mass means.

5. An aircraft according to claim 3 including means for displacing said rotor means in the direction of the rotor central axis, with respect to a mooring cable and means for supporting said mooring cable, against the action of a spring means.
   and further including means for changing the angle of incidence of said rotor means.

6. An aircraft according to claim 3 including means pivotally mounting said rotor means about the longitudinal axes thereof.

7. An aircraft according to claim 4 in which at least one of said jacket ring means carries supporting means at the outer end thereof which is effective in the vertical direction.

8. An aircraft according to claim 4 including landing gear means having resilient arms with roller means thereon for receiving said jacket ring means.

9. An aircraft according to claim 1 including means for effecting cyclic displacement of said rotor blades.

10. An aircraft according to claim 9 including weather vane means connected to said means for effecting cyclic rotor blade displacement, whereby said latter means is displaced with respect to the aircraft about the vertical axis in accordance with the air onflow of the ambient air.

* * * * *

UNITED STATES PATENT AND TRADEMARK OFFICE
CERTIFICATE OF CORRECTION

PATENT NO. : 4,004,759
DATED : January 25, 1977
INVENTOR(S) : Roland Hund

It is certified that error appears in the above-identified patent and that said Letters Patent are hereby corrected as shown below:

Cover page, item [73], the Assignee should read as follows:
- - - DORNIER GmbH. - - -

Column 1, line 47, after "retracted by" the word - - - means - - - has been omitted.

Column 4, line 11, "position" should read - - - is - - -.

Signed and Sealed this

Twelfth Day of April 1977

[SEAL]

Attest:

RUTH C. MASON
*Attesting Officer*

C. MARSHALL DANN
*Commissioner of Patents and Trademarks*